United States Patent

Jones et al.

[11] Patent Number: 6,069,966
[45] Date of Patent: *May 30, 2000

[54] APPARATUS AND METHOD FOR TIRE CONDITION ASSESSMENT

[75] Inventors: Barbara L. Jones; Stephen J. Davis; Marcus J. Hawkins; David Stollery, all of King's Lynn, United Kingdom

[73] Assignee: Snap-on Equipment Limited, King's Lynn, United Kingdom

[*] Notice: This patent is subject to a terminal disclaimer.

[21] Appl. No.: 08/888,213

[22] Filed: Jul. 3, 1997

[30] Foreign Application Priority Data

| Jul. 4, 1996 | [GB] | United Kingdom | 9614025 |
| Jul. 11, 1996 | [GB] | United Kingdom | 9614591 |
| Sep. 4, 1996 | [GB] | United Kingdom | 9618397 |
| Nov. 22, 1996 | [GB] | United Kingdom | 9624309 |
| May 1, 1997 | [GB] | United Kingdom | 9708779 |
| May 16, 1997 | [GB] | United Kingdom | 9709841 |

[51] Int. Cl.$^7$ .............. G06K 9/00; E01C 23/00; G01M 9/00
[52] U.S. Cl. .............................. 382/100; 73/146
[58] Field of Search ............ 356/139.09; 73/146

[56] References Cited

U.S. PATENT DOCUMENTS

| 5,054,918 | 10/1991 | Downing et al. | 356/152 |
| 5,561,244 | 10/1996 | Olesky et al. | 73/146 |

FOREIGN PATENT DOCUMENTS

| 469948 | 2/1992 | European Pat. Off. | G01B 11/22 |
| 547364 | 6/1993 | European Pat. Off. | G01B 11/24 |
| 547365 | 6/1993 | European Pat. Off. | G01B 11/24 |
| 1809459 | 6/1970 | Germany | G01B 11/22 |
| 4316984 | 8/1994 | Germany . | |
| 9508978 | 9/1995 | Germany | G01B 11/22 |
| 2241061 | 8/1991 | United Kingdom | G01B 11/00 |
| WO/9610727 | 4/1996 | WIPO | G01B 11/22 |
| WO9610727 | 4/1996 | WIPO | G01B 11/22 |
| 9707380 | 2/1997 | WIPO | G01B 11/22 |

*Primary Examiner*—Leo H. Boudreau
*Assistant Examiner*—Shawn Cage
*Attorney, Agent, or Firm*—Seyfarth, Shaw, Fairweather & Geraldson

[57] ABSTRACT

Method and apparatus for automotive tire condition and other article assessment is based upon radiation analysis of a rotated tire. Analysis of reflected radiation on the basis of intensity sensing provides a measure of tread depth and sidewall profile, together with tread location and other data. By positional analysis of the tread depth locations there is provided complementary information on the tread wear pattern. Sidewall profile determination enables identification of other tire condition factors. Tread depth and sidewall profile are also determined by laser or other radiation line image displacement techniques and a mounting system is provided for the apparatus enabling determinations to be made without the use of a roller bed. Proper positional alignment of the wheel to the apparatus is determined by means of a reference datum derived from reflected radiation within the apparatus. Proper defined proximity of the tire is defined by a pair of alignment bars positioned over an optical window of the apparatus.

16 Claims, 5 Drawing Sheets

APPARATUS AND METHOD FOR TIRE CONDITION ASSESSMENT

BACKGROUND OF THE INVENTION

1. Field of the Invention

This invention relates to a method and apparatus for tire condition assessment which is particularly but not exclusively applicable to automotive vehicles. An example of the application of the invention is a method and apparatus which could be incorporated into automotive wheel balance or brake testing equipment so that a simultaneous or contemporaneous assessment of tire tread and sidewall and other tire condition factors may be made when other wheel tests are performed on a vehicle. Likewise, the invention is also applicable to test equipment in the form, for example, comprising a drive-on ramp applicable to road side testing of a vehicle tire in situ, without dismounting from a vehicle. Such applications of the invention would be suitable for law enforcement and regulation compliance authorities and their mobile personnel. A further application relates to test equipment used by commercial roadside test operations, particularly those specializing in rapid test services.

2. Description of the Prior Art

Known systems in relation to tire tread assessment include the usual manual measurement techniques including the use of tread depth gauges for insertion into the tread, and the assessment of tread wear by image analysis of a track after paint-treatment of the tread.

Such prior systems are relatively crude and inconvenient to use in an automotive industry which requires relatively instantaneous assessment of vehicle equipment and operational characteristics.

There is disclosed in International publication number WO96/10727 (Russell) tire scanning apparatus and a corresponding method which is able to provide an output indicative of information relating to tire tread depth. In an embodiment, a laser sensor is utilized in relation to a tire which is rotated while the laser sensor is mechanically scanned across the lateral width of the tire tread, being carried on a carriage which can reciprocate across the tire width on slide rods or bars. By virtue of the lateral motion of the carriage, the single laser point is mechanically scanned across the tire. Such an arrangement is subject to significant shortcomings in terms of the ability of the apparatus to provide an acceptable range of tread determinations on a given wheel within the short period of time available for a roadside test. The system inevitably is subject to the mechanical limitations of the scanning mechanism for the laser point source, whereby the time implications of a complete scanning operation for a single wheel become unacceptable, and some means is needed to enable a substantially greater rate of tread assessment in order to provide a realistic and practical form of apparatus.

There is disclosed in DE 4316984 A1 (Mercedes) a system for automatic measurement of tire profile in which the profile is measured along a line across the rolling direction of the tire by a traversing measuring head using a contactless optical triangulation method. This system is likewise subject to the performance shortcomings of the previously described reference.

There is disclosed in GB 2 241 061A (FMC) a structured light scanning system for use in automotive service equipment in which a laser source directs a beam of known shape onto a wheel rim/tire assembly so as to form a light stripe thereon. As described on pages 9 and 10, the stripe 22 of light impinges the tire/rim assembly 21/19 and an array of sensing cells are excited. Pixels 52b are raised with respect to their neighbors and correspond to the valve stem 27 on the rim. Pixels 53b on the sensing cells correspond to the bump in the light stripe 22 where it intersects the periphery of the rim 19 of the wheel. The system is particularly applicable to determination of tire/rim assembly balance, runout and alignment or brake surface planarity and smoothness determinations.

SUMMARY OF THE INVENTION

An object of the present invention is to provide a method and apparatus for tire tread assessment offering improvements in relation to the shortcomings of the prior art discussed above and/or improvements generally.

The invention also provides a convenient and economical means for determining proper positional alignment of a wheel with respect to photometric or other tire assessment apparatus, by use of data derivable from the apparatus without the need for provision of any significant further hardware. The invention also provides a simple abutment system for defining proper proximity of a tire or other article under test with respect to a window of the apparatus, through which the radiation for analysis proceeds.

An important aspect of the invention relates to systems for mounting apparatus for tire tread assessment in relation to a vehicle tire for tread and/or other determination purposes. This aspect of the invention is concerned with the fact that roller systems for rotating a vehicle wheel for test purposes can be relatively highly costly in terms of original equipment costs and installation, and yet there is a need for an ability to carry out roadside vehicle wheel tests on a rapid and easily carried-out basis at a chosen roadside location. A method and apparatus capable of offering such a facility would be of considerable utility.

In an embodiment of the invention described below there is described a method and apparatus in which, by use of a radiation source and a radiation detector and associated signal processing apparatus, there can be obtained a read-out providing a direct measure of both tread depth and tread pattern, whereby a determination can be made of over/under inflation practices in relation to the history of the tire, and a corresponding measure obtained of potentially present wheel alignment problems. The embodiment is readily adapted for tire sidewall condition assessment by suitable re-positioning of the radiation source so as to be directed generally axially of the tire, instead of radially, and towards the sidewall thereof.

Figure 4:
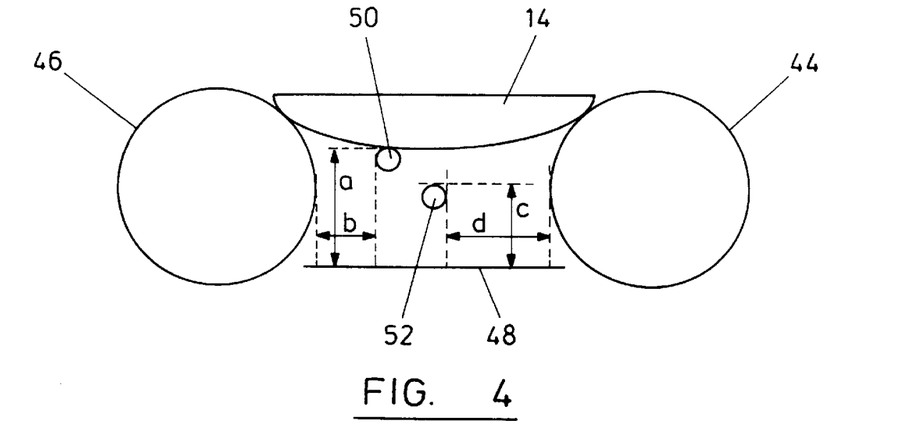
FIG. 4 is an enlarged diagrammatic view which shows dimensional information with respect to the embodiment of FIG. 3.

In a described embodiment, the radiation source emits a broad band beam of light which impinges on the full width of the tire under test. The tire illumination footprint is a regular well-defined zone, for example a line or other shape or pattern, with a uniform light intensity. The physical dimensions of a typical embodiment are shown in FIG. 4.

In another embodiment, a laser energy source is utilized and tread depth is analyzed on the basis of the laser image displacement as between the tread surface and tread bottom images. The same analytical approach applies to assessment of tire sidewall condition, and other tire conditions, by determining the profile of the side wall and identifying irregularities therein, or indeed by comparing same with a standard sidewall profile.

In a further embodiment of the invention the radiation source is arranged to apply the radiation to the tire in a direction which is generally slightly offset from radially with respect to the tire, and in a stripe or band or line across at least a portion of the lateral width of the tire at a given peripheral location thereon. In the method, the radiation detector receives radiation from the tire from across at least said portion of the lateral width thereof, so as to provide a measure of tread characteristics across said lateral width at said peripheral location by virtue of image displacement or offset. An analogous approach is adopted for assessment of tire sidewall and other tire structure or characteristics by adopting an image displacement technique for identification of sidewall and other structural discontinuities in the tire.

By providing the radiation source at a location and so arranged that it can apply the radiation as a non-radially incident line or stripe or band to the tire across a major portion or all of the width of the tire, or of its sidewall, the apparatus and method are able to make tire tread and sidewall determinations at very substantially greater rates than has been possible with the scanning type apparatus of the prior systems reviewed above. The line of radiation is able to provide a tire tread or sidewall image indicative of tread bottom and tread top or sidewall protuberances relative displacement across the lateral width of the tire or of its sidewall, relatively instantaneously. In this way, it is possible to obtain a tire tread or sidewall profile at a given peripheral location thereon and by means of a series of measurements to obtain an overall tire tread or sidewall profile determination whereby a mean measure of the tire condition is available. Such a relatively extensive determination can be made in a matter of seconds as the wheel/tire assembly is rotated, thereby providing a practical roadside test facility with the ability to provide data at the rates relevant for a system to be used under day-to-day practical (non-laboratory) conditions.

Also in an embodiment, the radiation source is a laser source and the method comprises the step of causing the radiation detector to detect the image displacement produced by the laser beam as between the base and the top of the tread, as a measure of tread depth across at least a portion of the lateral width of the tire. The use of a laser source enables a more effective determination of the laterally-extending tread profile at a particular peripheral location on the tire, so that the image provides a measure of tread depth and tread profile. Likewise in this laser energy using embodiment, by performing tire tread image and thus tire tread profile determinations at two or more locations around the periphery of a tire there is developed a profile of the tire enabling an overall assessment of its state of wear to be made. These determinations may be made at a series of locations around the tire and/or during rotation of the tire. The approach is the same for sidewall and other tire structural determinations.

In the embodiments of the invention applicable to tire sidewall and other tire structural condition assessments, the method and apparatus requires very little modification from that described above for tire tread assessment. Indeed, the apparatus requires only to be re-positioned in relation to the generally axially-facing tire side wall surface so that a profile of this can be obtained and thus the presence or otherwise of discontinuities in the sidewall profile can be identified.

Because in this embodiment the apparatus or module which contains the laser or other radiation source and the corresponding radiation sensor is located in front of or behind the tire, or indeed to one side of it, not directly beneath it, there is no tendency at all for dirt and dust and water, or any of these, to fall onto or otherwise reach the apparatus during the test. The test is performed in a non-contact manner at a "clean" location in front of or behind the tire—although the location is not in exact radial alignment with the tread of the tire where the laser line contacts it.

An important aspect of the embodiments concerns the facility to perform tests which require rotation of the wheel/tire assembly without the need to provide roller means. Thus, in the embodiment, rotation of the wheel/tire assembly is achieved, for example at a roadside location, while performing tire tread and sidewall or other tire condition tests, in a simple manner.

In accordance with this aspect of the invention the tire tread determination apparatus is supported from the structure of the vehicle on which the tire in question is mounted so that the step of making the necessary determinations of tire data can be made either during movement of the vehicle, or after such movement.

In one envisaged embodiment the apparatus employed for supporting the tire condition assessment unit is mounted on the vehicle by means of disengageable mounting means, so that the unit can be readily mounted and dismounted before and after the tests. An example of such disengageable mounting means is a suction unit which is manually operable, for example by means of a lever, so as to hold itself by suction to a smooth part of the vehicle's surface, for example any convenient part of the painted body of the vehicle. Usually, two or more such suction units would be provided together with an adjustable support frame or arm depending therefrom so that, once the suction units have been applied to a convenient part of the vehicle's body, the tire tread unit can then be readily located alongside the tire at a suitable location. Then, tread determinations can be made in sequence as the vehicle is moved forwards or rearwards, without any need to remove the wheel in question. Roadside tests can thereby be made quite readily provided a short stretch of suitable road or track is available for the purpose.

In accordance with this aspect of the invention any unit or apparatus requiring two or more determinations to be made of characteristics of a wheel and/or tire assembly could be mounted in relation to a vehicle wheel in this way, and thus this aspect of the invention is not limited to utility in relation to tire condition assessment.

An example of another system relating to wheel/tire characteristics which could be mounted in accordance with the principles just described above is that which is described in our co-pending U.S. application Ser. No. 686,964, filed Jul. 25, 1996, which relates to tire pressure determination by a noncontact or contact method using ultrasonic waves. This system can thus provide information on over/under inflation of tires.

It can now be seen that the embodiments of the invention provide a non-contact method of measuring tire condition and characteristics including tread depth and pattern, and sidewall condition, and which can readily be incorporated with apparatus measuring tire pressures (in accordance with the subject matter disclosed in our above-mentioned European application) and which itself uses a laser beam or stripe and related imaging optics. In an envisaged composite embodiment a unit is mounted so that several segments of the tire tread, within a complete revolution of the tire, can be assessed and recorded and processed to provide a measure of tire condition, including tire pressure. The composite system permits the provision of a wide range of diagnostic information including not only tire tread depth but also aspects of wheel alignment, these latter being available in accordance with matter disclosed in our co-pending U.S. application Ser. No. 718,784, filed Sep. 24, 1996. Thus, in this way, wheel toe adjustment and suspension misalignment measurements can be provided and the facility is thus available to provide a system which can be used in a number of environments including roadside situations, dealerships, tire shops, independent garages and fleet workshops.

A further aspect of the invention relates to the provision of means for determining the proper positional relationship between a tire to be tested and the tire assessment apparatus. In accordance with this aspect of the invention there is provided a method of photometric or other tire assessment by photometric or other incident energy analysis.

In an embodiment of the invention there is provided a method, and corresponding apparatus in which the positional relationship between a tire under test and the apparatus is determined by employing, as a reference base for positional analysis of the tire with respect to the apparatus, a reflected portion of the incident energy employed for analysis of the tire itself. The reflected portion of the energy is obtained by analysis of the internally reflected energy produced by an energy-transmitting surface in the apparatus, namely the external window thereof.

Thus, by reference to the internally reflected energy from the external window of the apparatus, through which the tire-analysis beam proceeds, there is obtained a reference datum which easily enables it to be determined whether the tire is in the proper 90 degree relationship to the apparatus.

In the embodiment, the energy employed is in the form of a band or stripe or line, as applied to the tire, and accordingly this energy format produces a corresponding reference band or line or stripe as an internal reflection from the internal surface of the window of the apparatus, which is at a known attitude with respect to the apparatus. In other words, the internally reflected radiation produces, in this example, a level reference base line which can be compared in attitude with the notionally vertical edge surfaces of the tire in order to determine whether the latter is correctly aligned with respect to the apparatus about its steering axes. If a correction is needed, this can be achieved either by physically moving the apparatus or the tire, or by a corresponding computational adjustment provided by the apparatus software.

In this manner, a convenient and simple and inexpensive means for achieving proper set up of the apparatus for accurate tire evaluation is provided at minimum extra cost.

It is envisaged that where the apparatus is installed as garage or service station equipment it may well be convenient to provide a roller system for rotation of the vehicle tire during test, and thus the vehicle would be driven onto a simple roller system suitably positioned in relation to the tire scanning apparatus. A modification envisages the provision of twin roller systems for simultaneous engagement with both front or both rear wheels of a vehicle, thereby achieving basic alignment of the vehicle with the tire test apparatus. In this way, the feature of checking proper positional alignment of the wheel with respect to the apparatus becomes a refinement for fine-tuning the positional relationship.

BRIEF DESCRIPTION OF THE DRAWINGS

An embodiment of the invention will now be described by way of example with reference to the accompanying drawings in which.

DESCRIPTION OF THE PREFERRED EMBODIMENTS

Figures 1, 2:
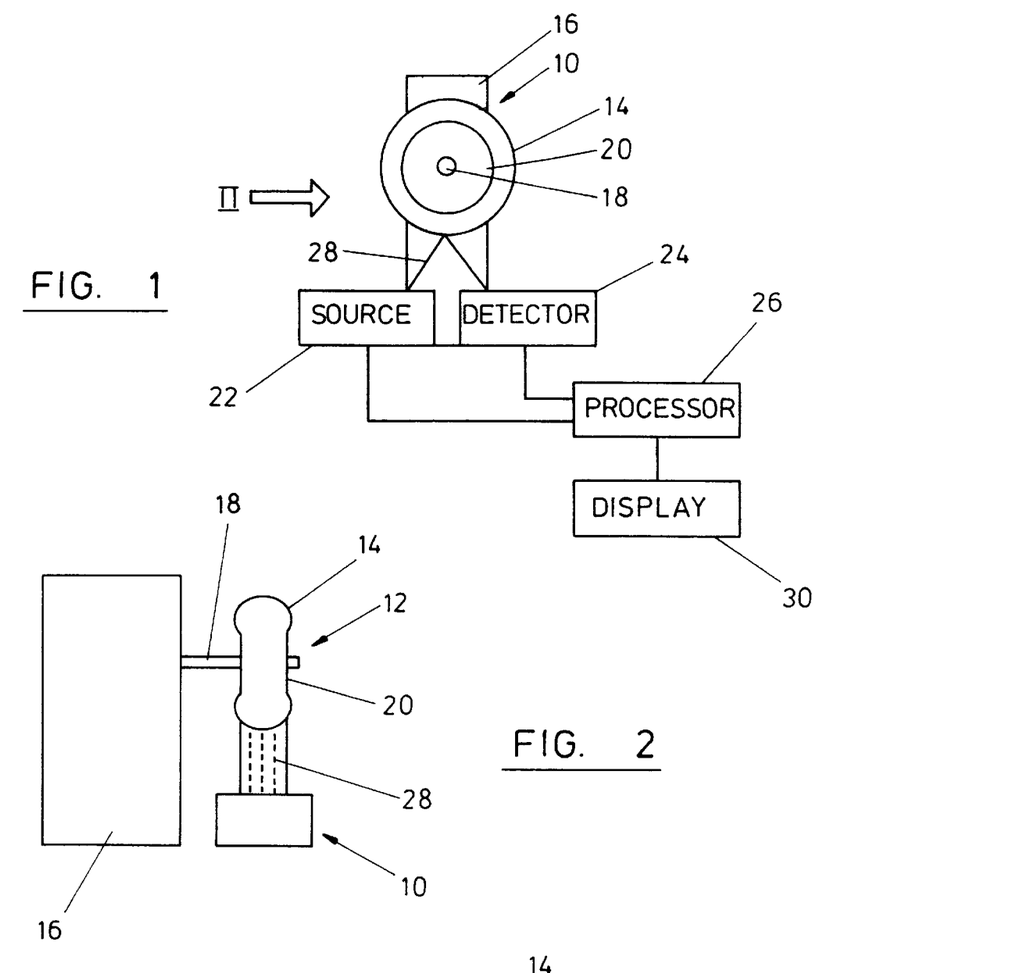
FIG. 1 shows a front elevational, partially block diagrammatic view of a first illustrative embodiment of the invention incorporated, merely by way of example, into wheel balancing apparatus.
FIG. 2 shows a corresponding view of the apparatus of FIG. 1 as seen in the directional arrow II in FIG. 1.

As shown in FIGS. 1 and 2, apparatus 10 for tire tread assessment comprises a rotary mounting 12 for a tire 14 to be tested. The mounting 12 in this embodiment is, merely by way of example, in the form of wheel balancer apparatus 16 which may be of conventional form and provides a driven axle 18 on which tire 14 is mounted via its associated wheel 20 for tire tread assessment purposes in accordance with the present invention.

As also shown in FIGS. 1 and 2, in accordance with the present invention there is provided a radiation source 22 and a radiation detector 24 together with associated signal processing apparatus 26 adapted to provide, in combination with the radiation source 22 and radiation detector 24, an intensity analysis function enabling analysis of the reflected radiation 28 as detailed below.

In use, radiation source 22 emits a regular well-defined line of light having a uniform intensity. Physical dimensions are provided for the embodiment of FIG. 4 and can be adapted to the corresponding layout of the present embodiment.

Figure 5:
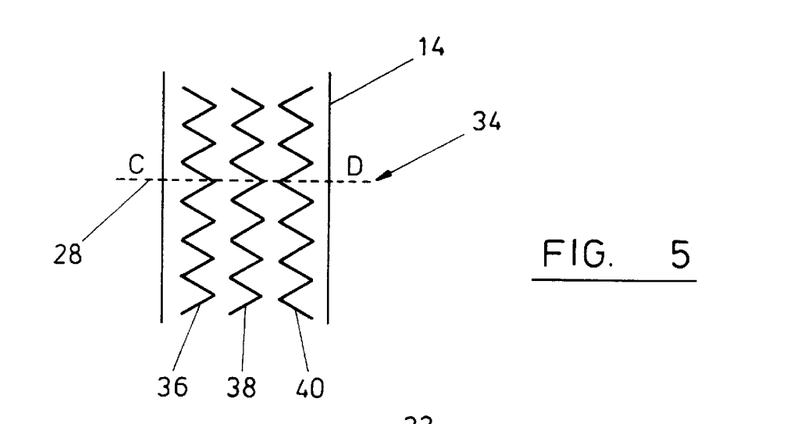
FIG. 5 shows a typical tire tread pattern with the location of a beam of incident radiation shown.
Figure 6:
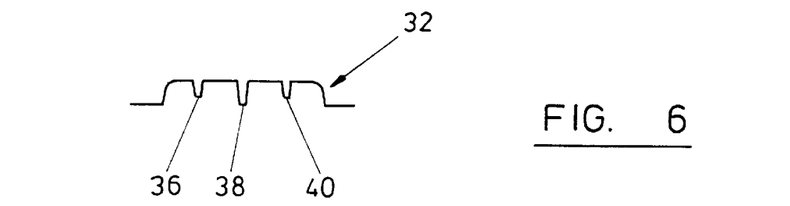
FIG. 6 shows an output trace for the apparatus for the preceding figures.

Signal processing apparatus 26 is coupled to a visual display unit 30 providing an output trace 32 as shown in FIG. 6. This trace represents the tread pattern at location 34 in FIG. 5 at which radiation 28 is incident upon the tire 14. Signal processing apparatus 26 provides an intensity analysis function in combination with the radiation detector 24 whereby the trace 32 provides a depth and position representation of the tread patterns 36, 38 and 40.

Radiation source 22 comprises a quartz halogen lamp coupled to a light guide producing the above-defined line emission having uniform light intensity. A laser source may be preferred in particular applications, and such an embodiment is described below with reference to FIG. 7 of the drawings.

Radiation detector 24 comprises an array of detector elements including a minimum of 375 such elements, having regard to a minimum tire tread groove width of 2 millimeters and a requirement for a minimum of 3 pixels in each groove. The line width of the beam of incident radiation on the tire should be less than 2 millimeters. The analogue output of detector 24 (in the range of 0 to 5 volts) is processed at 26 and displayed at 30.

A scanning rate of from 15 to 25 line readings per tire revolution, preferably 20, are considered sufficient for analysis purposes. In the roller brake system of FIGS. 3 and 4, for a maximum roller speed of 5 kilometers per hour operating against a tire of maximum radius of 0.3 meters, the minimum scan rate for the array of detector elements is 15 hertz per line of detectors.

Figure 3:
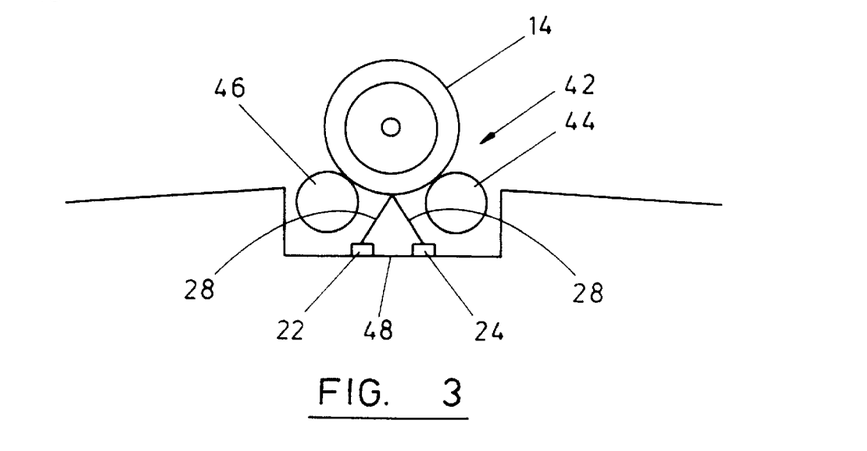
FIG. 3 in a view similar to FIG. 1 of a second and principal embodiment of the invention, with the assessment apparatus incorporated into apparatus with rollers.

In the embodiment of FIGS. 3 and 4, in place of the wheel balance apparatus 16 there is provided a roller brake system 42 in which rollers 44, 46 engage tire 14 and radiation source 22 and radiation detector 24 are disposed as previously, and are likewise in association with signal processing apparatus 26 and visual display unit 30. This embodiment operates substantially in the same manner as the embodiments of FIGS. 1 and 2, yielding similar detector output traces as discussed above.

FIG. 4 shows relevant dimensional data for this embodiment, the dimensions being defined with respect to a base plate 48 on which the radiation source and detector are mounted.

The size of the rollers used in this embodiment is dependent on tire size and weight of vehicle.

The above-described system is expected to be capable of resolving tire profile height and tread depth to 6 bits (i.e. $\frac{1}{2^6}=1.6\%$), such resolution being considered adequate to indicate the degree of wear on the tire in general and to provide more specific information as to tread depth.

There is shown in FIG. 4 in addition to the tire 14, rollers 44, 46 and base plate 48, an idler roller 50 and a static support bar 52. When a wheel 14 is not in position on rollers 44 and 46, idler roller 50 and bar 52 are raised by a spring (not shown) and the arrangement is such that the rise of these parts above a defined level triggers a safety cut-out switch isolating the electricity supply to the motors for rollers 44 and 46.

In a further embodiment, not illustrated, and otherwise constructed as described above in relation to FIG. 4, the radiation detector 24, providing a light intensity detection function, is replaced by a two-dimensional imaging camera.

Likewise, the radiation source 22 in the embodiment of FIG. 4 (not seen in FIG. 4 but described above in relation to FIGS. 1 and 3) is replaced by a corresponding light source providing a uniformly illuminated patch on the tire 14.

The imaging camera produces an electrical signal output based upon the secondary image produced in the camera by the incident radiation focused upon an array of light sensitive elements disposed in rows. The output of these elements may be analyzed in rows to produce a tire tread depth display corresponding to that shown in FIG. 6.

The output of the two-dimensional imaging camera is connected to the signal processing apparatus 26 as in the previous embodiments, so that this embodiment differs from these substantially only in the construction and arrangement of the radiation source and radiation detector.

In this embodiment, the two-dimensional imaging camera does not itself perform an image analysis function. The image data from the camera is signal-processed at 26, for example by analysis of the data from rows of light sensitive elements, to produce a tire tread depth display, for example as shown in FIG. 6.

Also in this embodiment, there is provided a system of synchronization between the wheel drive and the scanning of the light-sensitive elements or pixels, whereby coordinated scanning and annular movement enables an operational relationship between these functions which leads to enhanced results which are otherwise not available.

Alternative radiation sources and radiation frequencies could be employed, including possibly infrared radiation, such changes being accompanied by corresponding complementary changes in the radiation detector system and the intensity analysis arrangements. Also envisaged are changes in the radiation source projection system, such as the use of light guides, lenses and corresponding radiation control systems. Considerable modification in the hardware implementation is envisaged according to the requirements of location and systems available for other reasons. For example, it is expected that the means for mounting a tire to be tested for rotation will vary considerably. Usually, it will be preferred to retain the tire on the vehicle wheel, in situ on the vehicle. Accordingly, at a minimum, some means is needed whereby the tire and wheel can be rotated, such as the roller system described above with reference to FIG. 4. Such an arrangement may amount to no more than a simple mobile ramp and roller assembly providing suitable proximity arrangements with respect to the radiation source and radiation detector. In the case of a fixed installation, considerably more sophistication may be provided in relation to drives for the rollers and facilities promoting rapidity of testing all vehicle wheels, etc.

Figure 7:
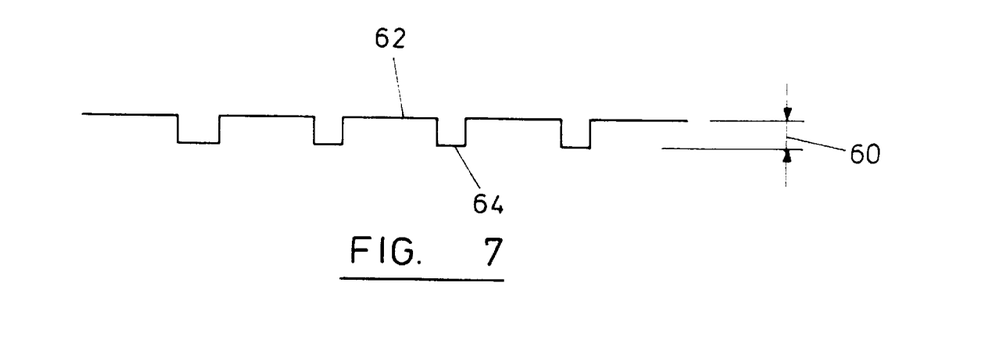
FIG. 7 shows an idealized output for the detector array of an embodiment utilizing laser image displacement for tread depth assessment.

In the embodiment of FIG. 7, which is otherwise constructed in a similar manner to the embodiments described above, a laser source is used in association with a detector array disposed in very much the same general spacial relationship to the tire tread under test as in the described embodiments above. In this embodiment, the assessment of the tread is effected by laser image displacement as opposed to intensity analysis. Accordingly, by means of a suitable scanning technique in relation to the detector elements of the detector array, for example a mechanical scanning technique, there is obtained an output generally in the castellated form shown in FIG. 7, in which the castellations correspond to the image displacement resultant from reflection of the laser energy from the tread surface and from the tread depth bottom, respectively. The depth 60 of castellations, 62, 64 provides a measure of the tread depth of the tire.

Figure 8:
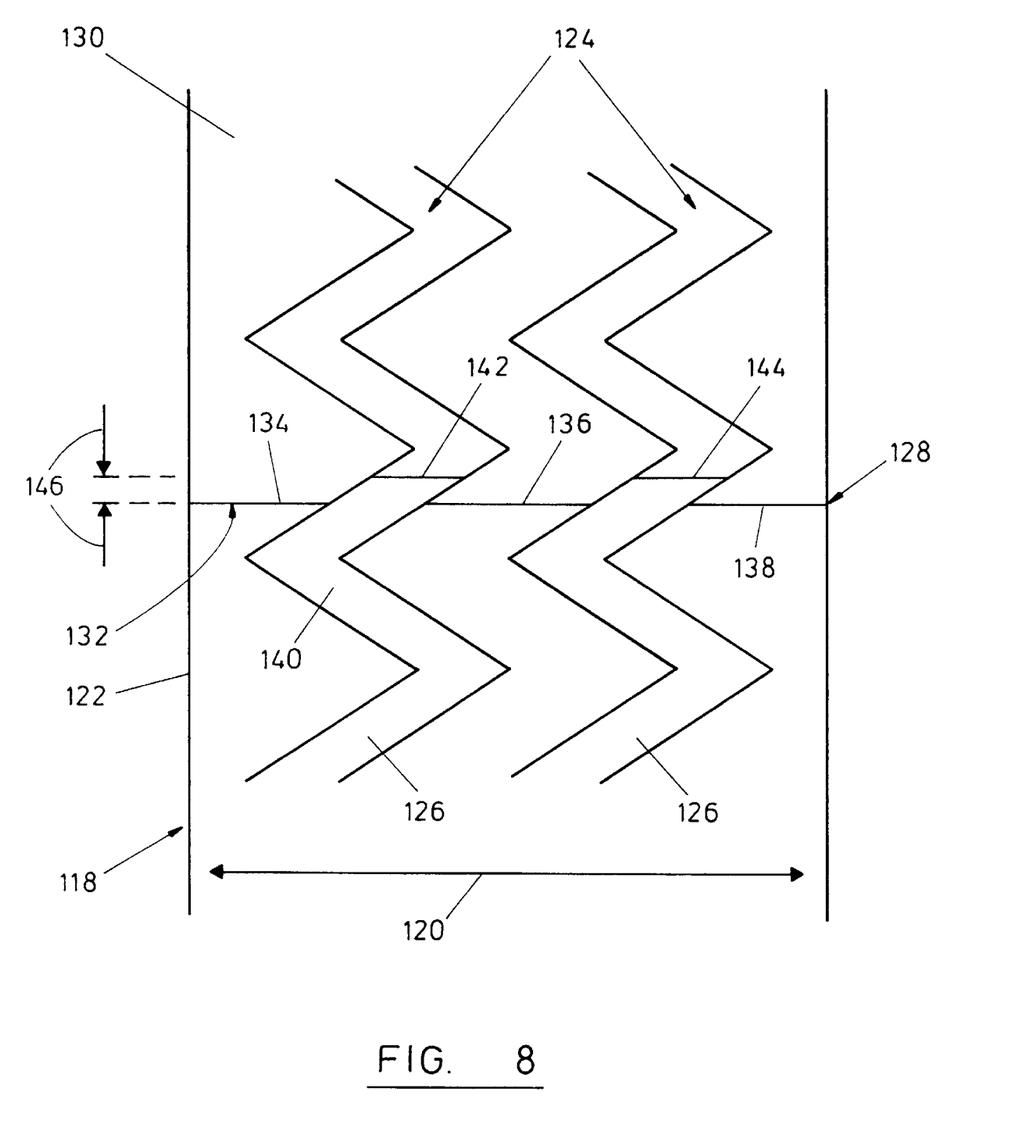
FIG. 8 shows on an enlarged scale a portion of the tread of a tire illustrating features of the invention of FIG. 9, below.
Figure 9:
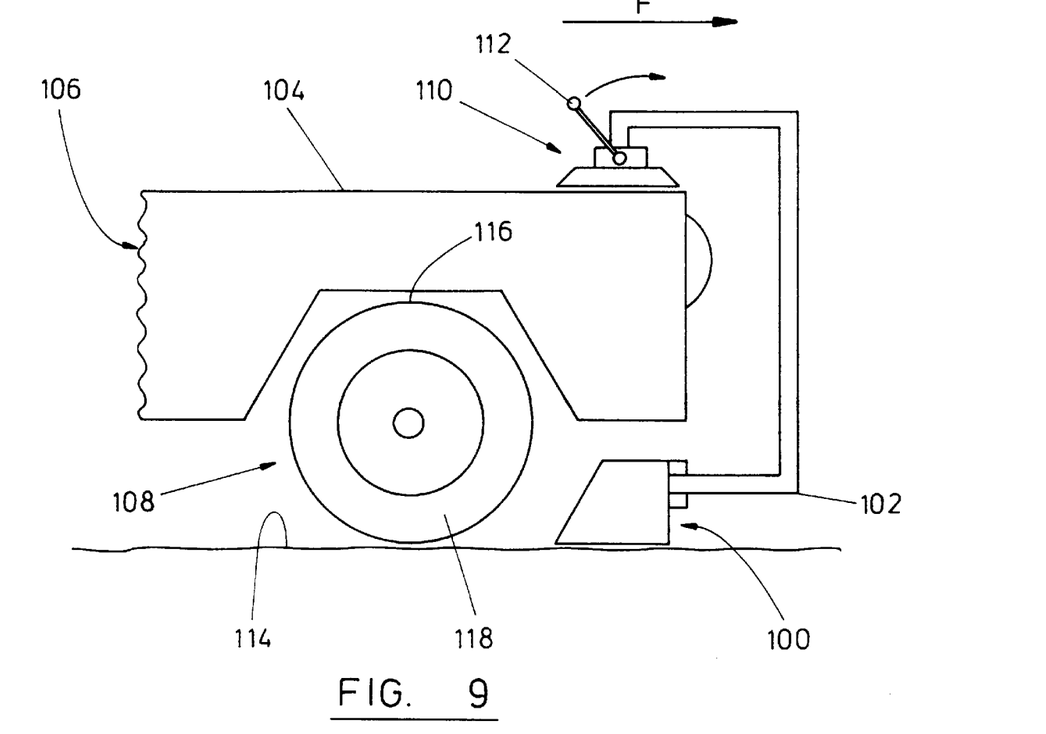
FIG. 9 shows a system for mounting a sensing head on a vehicle and in relation to the tire thereof.

Turning now to the embodiment of FIGS. 8 and 9, this corresponds to that of FIG. 7, but with certain important modifications. Thus, in FIGS. 8 and 9, a laser source and laser detector are provided in a sensing head 100 mounted by means of an arm 102 on the superstructure 104 of an automotive vehicle 106 in a defined relationship to a wheel 108 of the vehicle. Detachable mounting means 110 serves to removably secure arm 102 to superstructure 104 under the control of a lever arm 112. The mounting means may, for example, comprise a suction device or a magnetic device or a mechanical clamp device. Less conveniently, sensing head 100 may be arranged to be merely supported on the ground 114 at approximately the location indicated in FIG. 9.

As indeed is shown in FIG. 9, sensing head 100 is positioned at a location generally radially in-line with the tread 116 of a tire 118 on wheel 108.

Generally speaking, the spacial relationship between sensing head 100 and tire 118 is similar to that adopted in the embodiments of FIGS. 1 to 7, but with the following difference. In FIG. 9 the sensing head 100 is positioned at a location forwardly or rearwardly (with respect to the normal direction F of forward travel of the vehicle), so as to be generally in-line with the tread 116 of tire 118, while wheel 108 is supported on the ground 114. Thus, by adopting an arrangement in which the vehicle wheel (and indeed the vehicle) remains supported on the ground in the usual way and is capable of the normal rolling relationship with the ground, while positioning the sensing head appropriately in relation to the tire 118, there is provided the simple option of making intermittent or continuous tread determination measurements without the expense of provision of a roller support system for the wheel, or indeed a wheel mounting arrangement of the kind shown in FIG. 2.

In use, sensing head 100 is initially located with a defined relationship to tire 118, for example by being adjusted with reference to arm 102 so as to have an exactly horizontal attitude. This may be achieved by means of a simple spirit level device (not shown).

The laser source of sensing head 100 is adapted to produce laser energy as a line or band or stripe which can extend across at least a major portion of the lateral width 120 of tire 118 (see FIG. 8). This can be achieved by appropriate choice of laser source and/or by optical means known in the laser source technical field.

Turning now to FIG. 8, this shows, on an enlarged scale, a portion of the tread of tire 118, including tire wall portions 122 and patterns 124 of tread grooves 126 provided in the rubber or other polymeric material of the tire in the usual way.

The disposition of sensing head 100 and its laser source with respect to tire 118 is such that the laser line 128 is incident upon the structure of tire 118 in a non purely-radial direction. In other words, the laser line is inclined with respect to a radius through the tire periphery at the location where the laser line intercepts the tire. As a result the laser line 128 intercepts the top surface 130 of the tread along a line 132 having (in FIG. 8) three portions 134, 136 and 138. The laser line 128 intercepts the bottom surface 140 of the tread patterns 124 at two offset or displaced locations providing the two further portions 142, 144 of the laser line.

As can be clearly seen in FIG. 8, the degree of offset between the portions 134, 136 and 138 as against the portions 142, 144 amounts to a dimension 146, and this offset dimension 146 enables simple calculation of the tread depth on the basis of the angle of incidence of the laser beam with the tire, which latter is defined by the attitude of the laser emitter in sensing head 100 and the overall attitude of the sensing head with respect to the tire 118. These quantities are (for a horizontal attitude of the sensing head) known parameters which can be readily determined for a given set of apparatus.

Accordingly, it can now be seen that the laser line image provided by the line portions 134, 136, 138 and the offset line portions 142 and 144 with a degree of offset indicated at 146 provides a measure of the tread depth. Additionally, the profile of the laser line 128 provides an indication of the entire tread/tire profile at that particular location.

It can now be seen that the provision of a laser or other radiation source providing a radiation line extending laterally across a portion of the tire width enables, by means of the above-discussed line-offset technique, a determination of tread depth and tread profile, on the basis of the angular data relating to the non-radial incidence of the laser or other incident energy. By mounting the radiant energy sensor and source at a location permitting ground support of the relevant vehicle wheel while still mounted on the vehicle, the opportunity is provided to enable tread determinations to be made at intervals, or continuously, without resorting to the expense of rollers and the like.

Figure 10:
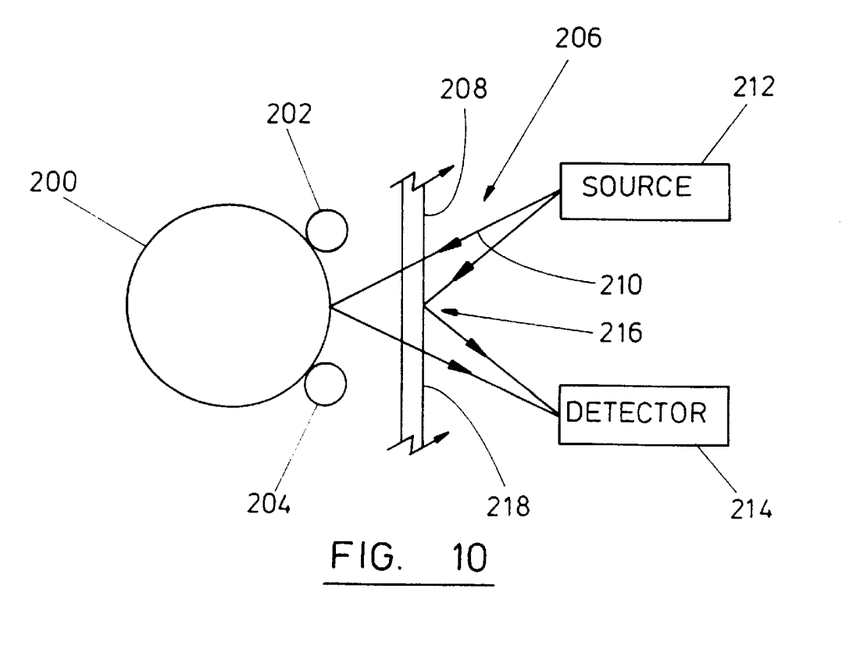
FIG. 10 shows, in a somewhat diagrammatic manner similar to that of FIGS. 1 and 3, an embodiment in which a tire is located with respect to tread assessment apparatus and its proper positional relationship determined by means of internally reflected energy.

In the embodiment of FIG. 10, which is not drawn to scale, a vehicle tire 200 is shown in abutting relationship with positioning rods 202, 204 of tread assessment apparatus 206 otherwise constructed as described above and comprising an external window 208 through which an energy beam 210 passes for tread assessment purposes from source 212 for reflection to detector 214, all as described above.

As shown at 216, reflection occurs from an internal surface 218 of window 208 to detector 214, whereby there is produced a reference or datum line enabling analysis of the positional relationship of tire 200 with respect to the apparatus 206. The datum line serves as a reference whereby the proper attitude of the tire with respect to the apparatus 206 can be readily achieved or adjusted for by means of the software of the system.

Figure 11:
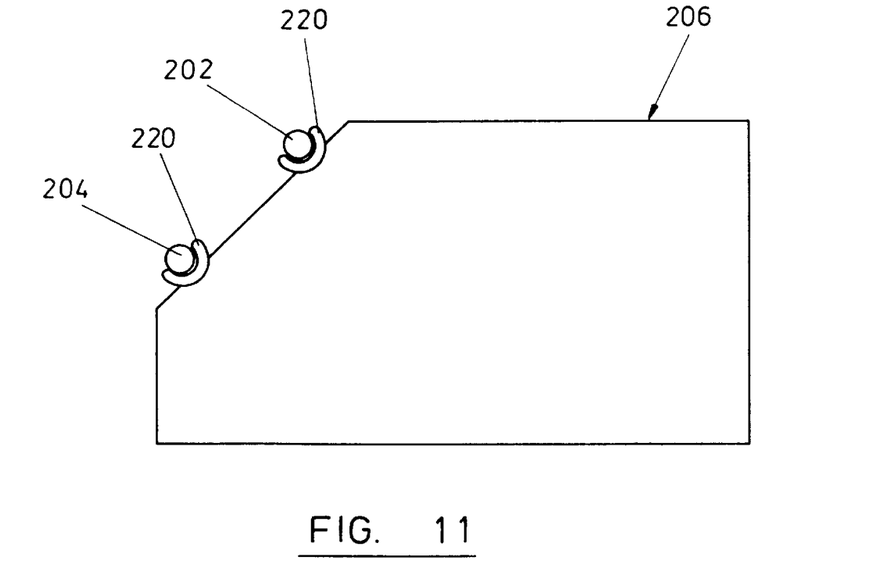
FIGS. 11 and 12 show side and front elevation views, respectively, of an embodiment of the apparatus employing the positional checking system of FIG. 10 and providing for exact tire proximity assurance.
Figure 12:
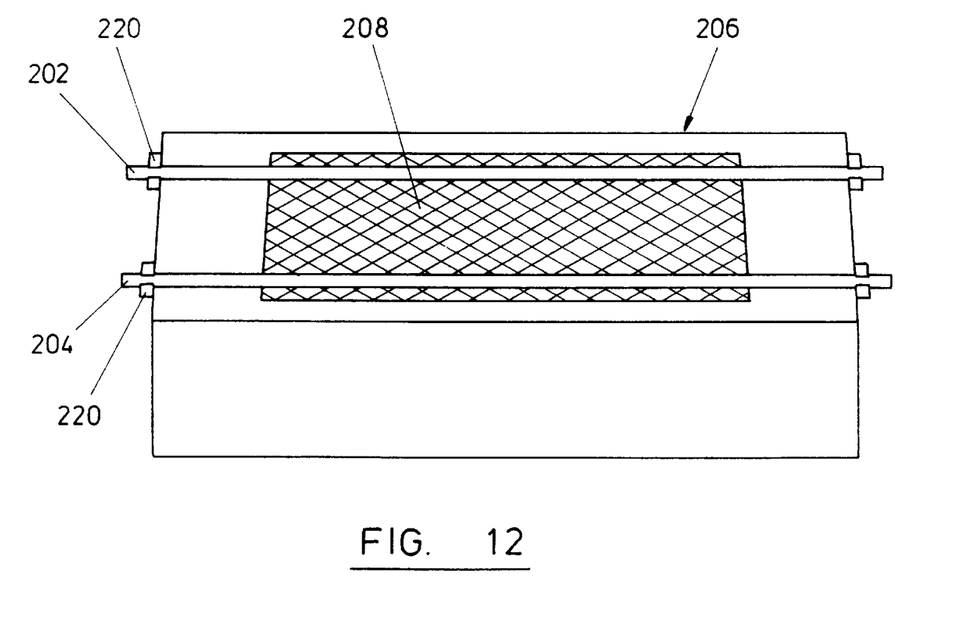

FIGS. 11 and 12 show a practical embodiment of the structure described above in relation to FIG. 10 and corresponding parts are numbered accordingly. The positioning bars or rods 202, 204 are mounted in mounting cups 220 and tire 200 is moved into abutting engagement with the bars so as to define an exact proximity for the tire. The mounting bars or rods can be journalled in bearings to allow for free rotation when the tire is rotated between successive analysis routines, or when effecting an overall tire assessment. Usually however, the apparatus will be constructed so that once the defined proximity has been established, and likewise the exact alignment of the apparatus, the latter is then fixed in this defined position with respect to the tire and the bars or rods can then be removed so that the tire can freely rotate. This arrangement is advantageous in terms of avoiding direct contact with and the transmission of vibration to the apparatus.

In a further embodiment, not illustrated, the method and apparatus is substantially as described above in the preceding embodiments, but the apparatus is repositioned so as to face axially of the tire, instead of radially, and to be positioned suitably in relation to the sidewall of the tire instead of in relation to its tread. The procedural and analytical steps are substantially the same as described above and the data obtained in the method enables a profile to be obtained of the tire sidewall, whereby discontinuities, notably protuberances, therein can be immediately identified for remedial action or for replacement purposes.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method of tire condition assessment comprising the steps of
   (a) mounting a tire to be tested for rotation including mounting a single radiation source and a radiation detector adjacent the tire by supporting the radiation source and the radiation detector from a vehicle on which the tire is mounted a vehicle on which the tire is mounted;

(b) directing incident radiation onto two or more circumferentially spaced locations on the tire by directing the radiation from only the single source of radiation as a band or stripe or line across at least a portion of the lateral width of the tire and locating the single source and the tire to be tested for illuminating the circumferentially spaced locations on the tire so that at each such location on the tire the incident direction is inclined to the tire radius at substantially the same oblique or non-zero angle;

(c) detecting radiation reflected from each of the locations on the tire by receiving at the detector radiation from at least said portion of the lateral width of the tire;

(d) processing the detected radiation to provide a radiation analysis function including information relative to a profile of the tire; and (e) determining at least one characteristic of the condition of the tire by reference to its profile including obtaining a measure of tread depth at each of said circumferentially-spaced locations on the tire on the basis of image displacement or offset by the tread depth;

the processing and determining steps being carried out during movement of the vehicle or after such movement.

2. A method according to claim 1, further comprising the step of performing an image analysis function in relation to the reflected radiation.

3. A method according to claim 1, further comprising the step of effecting an intensity analysis function in relation to the reflected radiation.

4. A method according to claim 1, wherein the radiation is laser radiation, and the radiation analysis function includes the step of effecting an image displacement analysis function in relation to the reflected radiation.

5. A method of making diagnostic and/or maintenance determinations of tire or wheel data on an automotive vehicle wheel without removing same from the vehicle, the method comprising the step of:

(a) removably mounting a radiation source and a radiation detector adjacent to the wheel by supporting the radiation source and the radiation detector from the vehicle on the vehicle;

(b) directing incident radiation onto the wheel from the radiation source and detecting radiation reflected from the wheel at the radiation detector; and (c) processing the detected radiation to provide a radiation analysis function including information relative to a profile of the wheel.

6. Apparatus for tire condition assessment comprising:

(a) mounting means for rotatably supporting a tire to be tested;

(b) a single radiation source located for directing incident radiation as a band or stripe or line across at least a portion of the lateral width of the tire onto two or more circumferentially spaced locations on the tire to be tested so that at each of the locations on the tire the incident radiation is directed at an incident direction inclined to a tire radius at substantially the same oblique or non-zero angle;

(c) a radiation detector located for detecting radiation reflected from each of the locations on the tire, said radiation detector including means to receive radiation from at least said portion of the lateral width of the tire; support means to support said radiation source and said radiation detector from structure of a vehicle on which the tire is mounted, and (d) a signal processor connected to said radiation detector and adapted to provide a radiation analysis function including information relative to a profile of the tire in relation to reflected radiation detected by said detector;

(e) said signal processor inducing means adapted to determine at least one characteristic of the condition of the tire by reference to its profile including a measure of tread depth at each said peripheral location on the basis of image displacement by the tread depth.

7. Apparatus according to claim 6, wherein said signal processor includes means to perform an image analysis function in relation to the reflected radiation.

8. Apparatus according to claim 6, wherein said signal processor includes means to effect an intensity analysis function in relation to the reflected radiation.

9. Apparatus according to claim 6, wherein said radiation source includes a laser source, and said signal processor includes means to effect an image displacement analysis function in relation to the reflected radiation.

10. Apparatus according to claim 6, wherein said signal processor includes means to develop a profile of the tire from tread determinations at a plurality of locations.

11. Apparatus for making diagnostic and/or maintenance determinations of tire an(i/or wheel data on an automotive vehicle tire and/or wheel without removing same from the vehicle, comprising: a radiation source, a radiation detector, mounting apparatus for mounting the source and the detector on the vehicle adjacent to the tire and/or wheel in a position for directing incident radiation onto the tire and/or wheel and detecting radiation reflected from the tire and/or wheel, and a processor coupled to the detector and adapted to provide a radiation analysis function including information relative to a profile of the tire and/or wheel in relation to reflected radiation detected by the detector.

12. Apparatus for tire condition assessment comprising:

(a) mounting means for rotatably supporting a tire to be tested;

(b) a radiation source located for directing incident radiation onto the tire to be tested;

(c) a radiation detector located for detecting radiation reflected from the tire;

(d) reflection means providing a planar reflection surface lying in a plane spaced from the tire and of known attitude with respect to the apparatus for reflecting a portion of said incident radiation for use as a reference base for positional analysis of the tire during tire condition assessment; and (e) a signal processor connected to said radiation detector and adapted to provide a radiation analysis function including information relative to a profile of the tire in relation to reflected radiation detected by said detector;

(f) said signal processor including means adapted to determine at least one characteristic of the condition of the tire by reference to its profile.

13. Apparatus according to claim 12, wherein said surface of known attitude includes a window and said reflected portion of said radiation is an internally reflected portion thereof.

14. Apparatus according to claim 12, further comprising abutment means engageable with the tire to enable a defined proximity to be established between said apparatus and the tire.

15. Apparatus according to claim 12, further comprising means supporting said abutment means in use between said window and the tire.

16. Apparatus according to claim 12, wherein said abutment means includes a pair of alignment bars disposed over said window for simultaneous abutting engagement with the tire in use.

* * * * *

UNITED STATES PATENT AND TRADEMARK OFFICE
CERTIFICATE OF CORRECTION

PATENT NO : 6,069,966

DATED : May 30, 2000

INVENTOR(S) : Barbara J. Jones et al.

It is certified that error(s) appear in the above-identified patent and that said Letters Patent are hereby corrected as shown below:

Delete on cover page under [*] "Notice: This patent is subject to a terminal disclaimer."

Column 10, lines 66-67, delete "a vehicle on which the tire is mounted".

Column 11, line 42, delete "from the vehicle".

Column 12, line 3, "inducing" should be -- including --.

Column 12, line 22, "an (i/or" should be -- and/or -- .

Signed and Sealed this

Eighth Day of May, 2001

Attest:

NICHOLAS P. GODICI

Attesting Officer

Acting Director of the United States Patent and Trademark Office